United States Patent
Specker

[11] 3,904,437
[45] Sept. 9, 1975

[54] SEPARATOR FOR ZINC CHLORIDE CELLS

[75] Inventor: Robert A. Specker, Lakewood, Ohio

[73] Assignee: Union Carbide Corporation, New York, N.Y.

[22] Filed: Sept. 21, 1973

[21] Appl. No.: 399,320

[52] U.S. Cl. ............... 136/103; 136/131; 136/145; 136/146; 136/157
[51] Int. Cl.² ..................... H01M 2/16; H01M 6/04
[58] Field of Search ........... 136/103, 131, 145, 146, 136/157

[56] References Cited
UNITED STATES PATENTS

| | | | |
|---|---|---|---|
| 2,748,183 | 5/1956 | Morehouse et al. | 136/157 X |
| 2,923,757 | 2/1960 | Klopp | 136/131 X |
| 3,018,316 | 1/1962 | Higgins et al. | 136/146 X |
| 3,272,657 | 9/1966 | Zenczak | 136/145 X |
| 3,573,106 | 3/1971 | Johnson et al. | 136/146 X |
| 3,647,552 | 3/1972 | Watanabe et al. | 136/146 X |
| 3,655,449 | 4/1972 | Yamamoto et al. | 136/145 X |
| 3,730,777 | 5/1973 | Krey | 136/146 X |

FOREIGN PATENTS OR APPLICATIONS

| | | | |
|---|---|---|---|
| 515,351 | 8/1955 | Canada | 136/146 |
| 45-21439 | 12/1970 | Japan | 136/146 |

Primary Examiner—Allen B. Curtis
Assistant Examiner—Thomas A. Waltz
Attorney, Agent, or Firm—C. J. Vicari

[57] ABSTRACT

A zinc chloride dry cell containing a separator comprising from about 5 to 30 per cent by weight of cross-linked polyacrylamide, and from about 70 to 95 per cent by weight of a mixture of talc and starch in a ratio of about 0.2 to 6.0 parts by weight of talc to 1.0 part by weight of starch.

6 Claims, 1 Drawing Figure

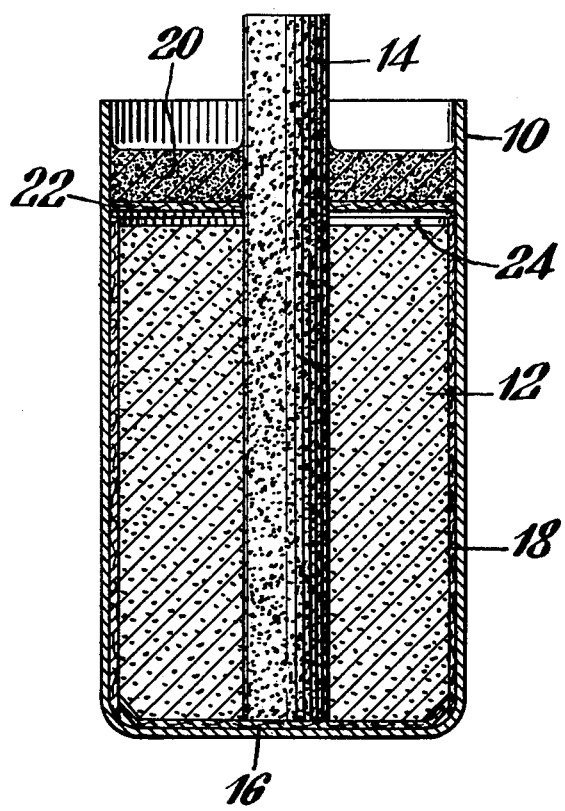

SEPARATOR FOR ZINC CHLORIDE CELLS

The present invention relates to the manufacture of electrochemical cells and, more particularly, relates to the use of a cross-linked polyacrylamide-starch/talc mixture as a separator material for zinc chloride dry cell batteries.

Dry cells are composed essentially of a consumable metal anode such as zinc, a cathode-depolarizer such as manganese dioxide and an electrolyte such as an aqueous solution containing a metallic salt of a halogen-containing acid especially, though not exclusively, a zinc salt such as zinc chloride.

The familiar Leclanche primary dry cell conventionally used as the power source in flashlights and other portable electric devices comprises a zinc anode, a cathode-depolarizer mix cake containing manganese dioxide and a conductive material such as carbon black or graphite, and an electrolyte consisting of an aqueous solution of zinc chloride and ammonium chloride (i.e. sal ammoniac). Various corrosion inhibitors such as mercuric chloride, chromates, etc. may also be used in relatively small amounts within the electrolyte.

Another type of primary dry cell which has attracted considerable attention in recent years is the magnesium dry cell. This dry cell system is very similar to the conventional Leclanche dry cell. Basically, the magnesium dry cell comprises a magnesium anode, a cathode-depolarizer mix cake containing manganese dioxide and a conductive material, and an electrolyte. The electrolyte consists essentially of an aqueous solution containing a magnesium salt such as magnesium chloride, magnesium perchlorate or magnesium bromide.

It has also been proposed in the prior art to produce primary dry cells using a zinc anode and an aqueous zinc chloride electrolyte. Such a dry cell system differs from the conventional Leclanche dry cell mainly in the absence of ammonium chloride from the electrolyte. This dry cell system, generally referred to as an all-zinc chloride system has been found to possess a service capacity of heavy drain which is superior to that of the conventional Leclanche dry cell and to be less prone to leakage.

The term "dry cell" implies that the electrolyte of the cell is immobilized, much of it being contained or absorbed by a layer of material interposed between the anode and cathode of the cell. This layer is generally referred to as the separator and is a physical member or structure which retains the electrolyte solution and provides a means for maintaining the anode in working engagement with the cathode while at the same time maintaining physical separation between the anode and cathode.

It is well known in the art to fabricate dry cell separators from various gelatinous paste-type materials formed from starch, flour, or methyl cellulose, which may each be used either unsupported or supported by paper similar backing or substrate material.

Although these materials have been widely used, they are not without their disadvantages, and improved substitutes have long been sought. Degradation of gelatinous separators on elevated temperature storage and heavy drain discharge in acidic electrolyte has been a long standing problem.

Among the materials suggested as improved separator formers have been cross-linked vinyl polymers, including polyacrylamide. U.S. Pat. No. 3,018,316 to Higgins et al. discloses that hydrophilic, partially cross-linked polyacrylamide gels are useful as separators in Leclanche-type dry cell batteries.

Cross-linked polyacrylamide type separators imbibe cell electrolyte and swell to form a stable gel. Bulking agents such as talc filler may be used in the separators to provide additional separation and resistance to cathode mix particle penetration during cell assembly.

Although the novel separator of the present invention can be employed in various types of electrochemical cells, it has been found, contrary to normal expectations that the novel separator is particularly suited for zinc chloride cells.

As is known to those skilled in the art, the desired general requirements of a separator for zinc chloride cells are that they should provide:

a. Physical separation between anode and cathode,
b. Continuous and intimate wet contact to anode and cathode,
c. Adequate ionic transfer from one to another, and
d. Good physical and chemical stability under both normal and abuse condition environment.

The presently used separators utilizing polyacrylamide/talc mixtures have satisfied most of the desired requirements of an acceptable separator for laboratory-made zinc chloride cells. The cross-linked polyacrylamide takes up the necessary cell electrolyte and swells adequately to form a stable gel. Unfortunately, however, the inert talc filler, used to provide the additional physical barrier to cathode mix particle penetration during cell assembly, limits the effectiveness of the formed gel in that it fails to contribute to the required tacky, intimate, and continuous wet contact to the anode. Moreover, the separator is subject to "drying-out" which manifests itself as a dip in the 2.25 ohm L.I.F. discharge voltage curve and may also appear as low amperage or "slow-start" (delay), especially in cells which have been stored for some time or at high temperature. Although this behavior is less apt to occur in laboratory-made cells (where the cathode mix is fairly wet and is highly and uniformly compacted into a springy resilient mass), it is however a serious problem utilizing high speed production equipment where the factory mix is drier and less well packed into the cell.

It is therefore an object of the present invention to provide a novel separator for zinc chloride cells.

Another object of the invention is to provide a novel separator containing a polyacrylamide-starch/talc mixture in which the starch particles are embedded or encapsulated in a matrix of electrolyte-insoluble but swellable polyacrylamide.

Another object is to provide a separator containing a partially cross-linked polyacrylamide/chemically modified starch/talc admixture for use in cells utilizing all-zinc chloride electrolytes, which separators maintain a wetted condition to anode and cathode throughout the life of the cell under abusive as well as normal conditions.

The foregoing and other objects and advantages of the invention will become apparent from the following description of the invention taken in conjunction with the sole FIGURE in the accompanying drawing which is a vertical section of a primary zinc chloride dry cell embodying the invention.

Broadly contemplated, the present invention provides a primary dry cell comprising a zinc anode; a cathode depolarizer mix cake containing manganese dioxide, a carbonaceous conductive material, and an electrolyte; and a separator interposed between said anode and said cathode depolarizer mix and also containing a portion of said electrolyte, said electrolyte consisting essentially of an aqueous solution containing zinc chloride, said separator comprising from about 5 to 30 per cent by weight of cross-linked polyacrylamide, and from about 70 to 95 per cent by weight of a mixture of talc and starch in a ratio of about 0.2 to 6.0 parts by weight of talc to 1.0 part by weight of starch, perferably corn starch which has been etherified with an etherifying agent selected from the group consisting of ethylene oxide and propylene oxide to a degree of substitution of less than 0.2 and which has been cross-linked with a cross-linking agent selected from the group consisting of formalin, epichlorohydrin, urea and melamine. Compositions are expressed herein and in the claims with respect to the proportions on a dry weight basis of the three primary separator constituents: polyacrylamide, talc, and starch.

Referring to the drawing, there is shown a cylindrical primary dry cell comprising a zinc cup or can 10 containing the cathode depolarizer mix cake 12 which is made from an electrolyte wet mixture of manganese dioxide particles and a finely divided conductive material such as carbon black or graphite. The mix cake 12 is extruded from this mixture into a separator-lined zinc can in the usual manner and a central carbon electrode 14 is inserted therein to form a conventional compressed cathode structure. The cathode mix cake rests on an insulating cup or washer 16 at the bottom of the zinc cup or can. In the embodiment of the invention illustrated, the thin film separator 18 is disposed between the inner side walls of the zinc cup or can 10 and the cathode depolarizer mix cake 12. This thin film separator 18 is composed of a thin bibulous paper coated on one or both sides with a composition comprising from about 5 to 30 per cent by weight, perferably about 8 to about 25 per cent by weight, of a cross-linked polyacrylamide, the remainder comprising from about 0.2 to 6.0 parts by weight of an inert filler, preferably talc, to each 1.0 part by weight of starch, preferably an etherified cross-linked corn starch which has been etherified by reaction with ethylene oxide or propylene oxide and which has a degree of substitution of less than 0.2.

The most preferred coating composition comprises from about 12 to 22 per cent by weight cross-linked polyacrylamide, the remainder comprising 78 percent to 88 percent of a mixture of talc and starch in a ratio of 1.0 to 3.0 parts talc to 1.0 part by weight of etherified cross-linked starch.

The dry cell is further provided with a subseal 20 which may be made of wax or pitch poured while hot onto the top of a bobbin washer 22 within the open end of the zinc cup or can 10. The subseal 20 and bobbin washer 22 are positioned above but spaced from the top of the cathode depolarizer mix cake 12 so as to provide a small "air space" 24 into which the electrolyte may expand on discharge of the cell. As mentioned previously, the separator 18 has as one of its ingredients, a cross-linked polyacrylamide.

The polyacrylamide useful in the present invention can have a molecular weight of from less than 100,000 to greater than 10 or 20 million but preferably is in the range of 200,000 to 15,000,000. However, the most preferred separators for general purpose battery use have been made from a non-ionic homopolymer of acrylamide having a molecular weight of approximately 4 to 6 million. This material is generally commercially available under the trade name "Cyanamer" P 250 Polyacrylamide from American Cyanamid Company, Wayne, N.J.

The amount of polyacrylamide useful will generally be between 5 and 30 per cent by weight, preferably between 8 and 25 per cent by weight and most preferably 12 to 22 per cent by weight based on the total dry weight of the three component mixture comprising the separator coating.

The polyacrylamide is cross-linked and the cross-linked material serves as a binder film to hold the inert filler and the starch onto the dry separator. The polyacrylamide is preferably cross-linked according to the procedure described in the co-pending application Ser. No. 252,510 of Charles Davis, Jr. filed on May 8, 1972, now abandoned, and entitled "Battery Separators". Briefly the method disclosed therein provides for the cross-linking of polyacrylamide by adding to an aqueous solution of polyacrylamide a chromium-containing compound wherein a major portion of the chromium is present at a valence other than +3 and a compound which will react with said chromium-containing compound to yield chromium ions at a valence of +3.

Moreover, according to the disclosure, it appears that, while the chromium ion may possess a valence of +3 or +6, only ions having the +3 valence are effective as cross-linking agents for polyacrylamide. It is possible, therefore, to have chromium ions present in a polyacrylamide solution without causing cross-linking provided the ions are at a +6 valence. The addition of a compound which will reduce the chromium +6 ion to a +3 valence will initiate cross-linking of the polyacrylamide. The cross-linking progresses only to the degree that chromium ions at a +3 valence becomes available, thereby giving a positive control of the degree and rate of cross-linking by controlling the number and speed at which chromium ions of +3 valence are produced. The chromium ion may also possess a valence of +2 but is unstable in this form and readily oxidized to +3 in the presence of air or in acid solution. For this reason, the chromium +2 ion is not recommended.

A reactive sequence of the kind described above readily lends itself to mass production techniques since one of the ingredients, namely, the compound containing chromium at a valence of +6, can be added to a polyacrylamide solution well in advance of its use. The other ingredient, namely, the compound which will react to reduce the chromium +6 ions to a valence of +3, can be selected for its speed of reaction to attain whatever rate is desired for the production of chromium ions at a valence of +3. In addition, choosing the best time for the addition of this single component will ensure that cross-linking starts at the most desirable time.

Any compound containing chromium at a valence of +6 will be useful, provided that it is compatible with the other components of the cell and products of the cell reaction. Preferred chromium compounds are those containing the $Cr_2O_7^=$ ion and include for example the alkali metal, alkaline earth metal and ammonium dichromates. Sodium dichromate, potassium dichromate, etc. are typical examples. A reducing agent to convert the $Cr^{+6}$ ion to $Cr^{+3}$ can be any compatible compound containing anions which are more electropositive than the $Cr_2O_7^=$ ion. Examples of such compounds include the sulfite, bisulfite and thiocyanate salts of alkali metals, alkaline earth metals and ammonia.

The modified starch preferred as one of the ingredients in the separator mixture of the present invention may be prepared by converting a common natural starch such as corn starch to an alkyl ether and then subjecting it to a cross-linking polymerization or subjecting the starch to a cross-linking condensation followed by an alkyl-etherifying treatment. The starch may be polymerized with a cross-linking agent such as formalin, epichlorohydrin, urea, or melamine and may be etherified with an etherifying agent such as ethylene oxide or propylene oxide. The modified starch material most useful in the present invention is produced commercially by the Nichiden Kagaku Company, Ltd., Osaka, Japan, under the trade name "Rongum". A full disclosure of this modified starch and the method for its preparation can be found in Japanese Pat. No. 1962-5208, published on June 20, 1962.

The following chart, (as shown in the aforementioned patent) illustrates the preparation of the preferred starch material of the invention.

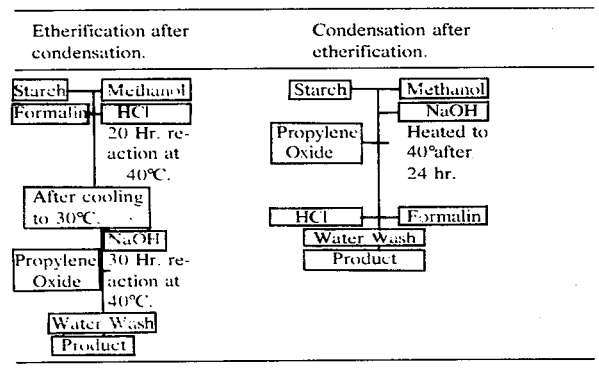

It will be appreciated that the operable compositional range covers a fairly wide area. As a matter of fact, the limits are set in some cases by considerations other than cell performance. Above about 25 per cent cross-linked polyacrylamide, the coating dries very slowly and 30 per cent polyacrylamide is considered an upper practical limit for standard oven drying procedures. At the lower preferred limit, i.e. below about 8 per cent polyacrylamide, the binder action becomes a critical factor, with a possibility of spalling or crumbling of the coating. A value of 5 per cent as the lower limit is operable with certain starches, fillers, and papers but is not desired because of the relatively poorer results obtained at the lower limit. With respect to the ratio of filler to starch, usable cells are obtained over the entire range, but a falling off of high temperature storage stability occurs at or near the two limits, i.e. no filler or no starch. Thus the range of filler to starch of 6/1 to 0.2/1 is believed to represent the safe range of operability in terms of cell performance.

The separator can be fabricated according to conventional techniques. Thus in one such technique, the ingredients can be introduced into solution accompanied with agitation, and allowed to reach a viscosity of 6,000 to 10,000 centipoise at which time it can be coated onto a suitable inert substrate. Suitable substrates include electrolyte-permeable papers such as alpha cellulose paper, kraft paper, paper fabricated from beta glass fibers or synthetic fibers as well as thin woven or non-woven inert textile fibers.

The following Examples will illustrate the present invention.

EXAMPLE I

A separator was prepared from the following formulation. Corrosion inhibitors were incorporated at levels conventionally employed.

Formulation

Water — 80 grams
Polyacrylamide powder Cyanamer P-250 from American Cyanamide Company — 3 grams
Humectant (zinc chloride) — 2.15 grams
Organic corrosion inhibitor (PPPG) — 1.65 grams
    (Paraphenyl phenoxy polyethylene glycol)
Mercury corrosion inhibitor ($HgCl_2$) — 0.38 grams
Cross-linking agents —
    Potassium dichromate ($K_2Cr_2O_7$) — 0.28 gram
    Potassium thiocyanate (KSCN) — 0.28 gram
Talc filler powder — 6 grams
Modified starch etherified with ethylene oxide and having a degree of substitution of less than 0.2 (Rongum NA-2) starch powder — 6 grams.

The above ingredients were placed into solution by stirring and allowed to reach a viscosity of 6,000 to 10,000 centipoise at which time it was ready for a coating application.

Coating

Substrate: Alpha cellulose paper — 0.004 inch thick
Coater: Doctor blade type — 0.025–0.030 inch gap
Approximately 300 milligrams/sq. inch of the above wet gel solution was applied to one face of the paper which was then dried in a radiant heat oven to give a final overall coated sheet thickness of 0.006 inch. The material was dry to the touch but retained enough moisture due to the presence of zinc chloride humectant to remain flexible (non-brittle).

Another separator was fabricated according to the above procedure except that 6 grams of talc filler powder were substituted for the modified starch. Thus the separator contained no modified starch and was used as a control for comparing the novel separator containing the modified starch with the control.

Cell Assembly

The two types of separator were employed on conventional factory cell manufacturing equipment to produce commercial type standard "D" size cylindrical dry cells. Cathode mix formulation consisted of the usual acetylene black and manganese dioxide mixture wetted with aqueous zinc chloride electrolyte and extruded into the separator-lined zinc anode can by conventional procedures.

The standard test most affected by the separator difference is the 2.25 ohm per cell L.I.F. test, especially after high temperature cell storage, e.g. 1 week at 71°C. The data for this test are summarized in the following table. (L.I.F. test is discharge at 4 minutes per hour for 8 hours per day and 7 days per week).

TABLE

| | Fresh Test | | | Minutes to Cutoff on L.I.F. at 20°C. After 1 Week 71°C | | | % Service Loss | | |
|---|---|---|---|---|---|---|---|---|---|
| | 1.1V | 0.9V | 0.65V | 1.1V | 0.9V | 0.65V | 1.1V | 0.9V | 0.65V |
| Control | 262 | 452 | 816 | 177 | 285 | 430 | 33 | 37 | 47 |
| Separator with modified starch | 287 | 468 | 782 | 223 | 400 | 723 | 23 | 15 | 8 |

It is evident that the control cell suffered badly servicewise following high temperature storage whereas the improved separator gave much improved service maintenance. In the above example, the excellent results were achieved when 50 per cent of the talc employed in the control lot was substituted with modified starch. Equivalent results were obtained when 67 per cent of the talc was substituted with modified starch. However, substitution of 100 per cent of the talc with the modified starch in the zinc chloride cell resulted in comparatively poorer results after 71°C. storage.

EXAMPLE II

Cells were prepared according to the same procedure and ingredients of Example I except that cells were tested which differed only in the percentage of starch/talc concentration. The results are indicated below:

| | | Fresh Test | | | Minutes to Cutoff on L.I.F. at 20°C. After 1 Week 71°C. | | |
|---|---|---|---|---|---|---|---|
| | | 1.1V | 0.9V | 0.65V | 1.1V | 0.9V | 0.65V |
| Control " (5/19/72) | Roll No. 282 | 253 | 400 | 676 | 192 | 334 | 620 |
| 17% Starch | | 313 | 506 | 848 | 219 | 412 | 736 |
| 33% Starch | | 309 | 516 | 836 | 222 | 436 | 789 |
| 67% Starch | | 296 | 524 | 867 | 205 | 442 | 790 |

EXAMPLE III

The procedure of Example I was repeated on cells which were fabricated identically to the cells of Example I except for the type of starch utilized. The starches utilized are those which were commercially available and constituted a starch from the Corn Products Corporation, a conventional starch known as Flotex-Waxy Maize and a Buffalo corn starch. The results are indicated below:

| | Fresh Test | | | Minutes to Cutoff on L.I.F. at 20°C. After 1 Week 71°C. | | |
|---|---|---|---|---|---|---|
| | 1.1V | 0.9V | 0.65V | 1.1V | 0.9V | 0.65V |
| 50% Flotex | 293 | 497 | 821 | 231 | 464 | 803 |
| 50% Buffalo Corn Starch | 304 | 503 | 807 | 213 | 437 | 803 |
| 50% Corn Products Corporation | 280 | 455 | 766 | 192 | 434 | 784 |

In addition to the above Examples demonstrating the advantage of the instant invention other observations were made and conclusions drawn therefrom.

Visual observation aided by the microscope indicates that the incorporation of the modified starch-based material in the separator film provided starch particles which were embedded or encapsulated in a matrix of the electrolyte-insoluble polyacrylamide. When such a separator was assembled into a cell, in addition to the absorption of electrolyte into the polyacrylamide, the starch particles gelatinized and swelled by action of the cell electrolyte and because of the greater tackiness of such gels improved intimate and wet contact to the anode was attained.

The degree of swelling by the starch material was significantly greater than that of the polyacrylamide film and it follows that the quantity of electrolyte imbibed by the starch gel was considerably greater. In a common electrolyte concentration (32 per cent zinc chloride solution) used in $ZnCl_2$ cells the specific modified starch as described herein swelled unconfined to some 10 times the dry particle volume compared with about 2 times for cross-linked polyacrylamide film.

As indicated previously, important to separator function is the maintenance of the wetted contact to anode and cathode throughout the life of the battery under normal as well as abusive conditions. In the case of the conventionally partially cross-linked polyacrylamide utilized it is believed that under conditions of abuse discharge of the battery or of prolonged storage at elevated temperatures progressive additional cross-linking occurs. This results in a contraction or shrinkage of the polyacrylamide gel structure with a reduction in its absorbed electrolyte and tack. Advantageously however, the gel structure of the modified starch will remain swollen, and will continue to exert the pressure and tack necessary to assure good contact to the anode and cathode over an adequate area. The separator-anode interface on examination after discharge test shows a uniformly mottled appearance and correspondingly uneven anode consumption. This is believed to reflect the shrinkage of polyacrylamide away from the anode at many spots and the maintenance of full contact in most other spots by the starch granules. It has been postulated that this characteristic behavior may actually be of benefit in providing convenient escape paths to the upper air space for anodically generated gas which might otherwise develop large bubbles or areas where gas would push the separator away from the anode. Thus, the combination of the cross-linked polyacrylamide and modified starch/talc in a separator for zinc chloride cells provides a separator with the following advantages:

1. Immobilized or contained gel pockets,
2. Exceptional wet contact to anode,
3. Improved adhesion to the anode,
4. Maintenance of contact during cell storage and discharge,
5. Adequate physical separation, 6. Good ionic transfer medium,
7. Adequate stability,
8. Unique surface structure, and
9. Compensation of uneven cathode mix packing and drier mixes.

Other starches than Rongum are useful in the practice of this invention. It has been tested most extensively and is preferred because previous testing of its basic properties indicated it is inherently more resistant to oxidation and hydrolysis than other battery starches. Surprisingly, however, even less highly regarded starches such as corn starch and "Flotex" starch (available from National Starch Co. and believed to be a waxy-maize type starch) have performed much better than was anticipated when employed with cross-linked polyacrylamide and talc according to the teachings of this invention as shown in Example III. In a manner not yet understood the polyacrylamide exerts a protective action on the starch, thus permitting utilization of the tack and swelling properties of starch while minimizing its tendency to degradation in acidic battery systems. At present it appears that any battery grade corn starch can be employed in the present invention. A "battery grade" starch is one which swells in battery electrolyte to give a tacky paste, which is free of impurities such as harmful metals or metal salts and reducing sugars, and which is reasonably stable against degradation in batteries under normal use. The source and properties of such starches varies in different parts of the world and depends on the local supply.

It was indeed surprising to discover that the novel separator of the present invention is particularly suitable for zinc chloride dry cells. As is known in the art, the utilization of starch in separators for zinc chloride dry cell systems carries certain undesirable effects. It appears that on discharge the high zinc chloride concentration at the anode surface degrades the starch resulting in liquefaction and subsequent leakage. Although I cannot fully explain the phenomenon, it appears that the polyacrylamide exerts a protective effect against degradation on the starch resulting in a dry cell characterized by improved performance without leakage.

It will be obvious that while the present invention has been set forth in some detail and described with particularity, it is susceptible to changes, modifications and alterations without departing from the scope of the invention as defined in the appended claims.

What is claimed is:

1. A primary zinc chloride dry cell comprising a zinc anode; a cathode depolarizer mix cake containing manganese dioxide, a carbonaceous conductive material, and an electrolyte; and a separator interposed between said anode and said cathode depolarizer mix and also containing a portion of said electrolyte, said electrolyte consisting essentially of an aqueous solution containing zinc chloride, said separator comprising a paper substrate, from about 5 to 30 per cent by weight of cross-linked polyacrylamide, coated on at least one side of said paper substrate, said coating including from about 70 to 95 per cent by weight of a mixture of talc and starch in a ratio of about 0.2 to 6.0 parts by weight of talc to 1.0 part by weight of starch, said cross-linked polyacrylamide serving as a binder for said mixture of talc and starch.

2. A primary zinc chloride dry cell according to claim 1 wherein said starch is a cross-linked corn starch which has been etherified with an etherifying agent selected from the group consisting of ethylene oxide and propylene oxide to a degree of substitution of less than 0.2.

3. A primary zinc chloride dry cell according to claim 2 wherein said cross-linked polyacrylamide is present in said separator in an amount of about 8 per cent to 25 per cent by weight and wherein said mixture of talc and starch is present in an amount of about 75 per cent to 92 per cent by weight.

4. A primary zinc chloride dry cell according to claim 2 wherein said cross-linked polyacrylamide is present in said separator in an amount of about 12 to 22 per cent and wherein said mixture of talc and starch is present in an amount of 78 to 88 per cent by weight.

5. A primary zinc chloride dry cell according to claim 4 wherein the ratio of talc to starch is 1 to 3 parts talc to 1 part by weight of starch.

6. A zinc chloride primary dry cell according to claim 1 wherein said starch is cross-linked with a cross-linking agent selected from the group consisting of formalin, epichlorohydrin, urea and melamine.

* * * * *